United States Patent [19]
Hanyu et al.

[11] Patent Number: 5,112,027
[45] Date of Patent: May 12, 1992

[54] METAL DIAPHRAGM VALVE

[75] Inventors: Takaomi Hanyu, Yamato; Kouki Tada, Yokohama, both of Japan

[73] Assignee: Benkan Corporation, Tokyo, Japan

[21] Appl. No.: 531,717

[22] Filed: Jun. 1, 1990

[30] Foreign Application Priority Data

Jun. 21, 1989 [JP] Japan .................. 1-159043
Aug. 19, 1989 [JP] Japan .................. 1-213940

[51] Int. Cl.$^5$ .................. F16K 7/16; F16K 31/50
[52] U.S. Cl. .................. 251/331; 92/103 M; 251/274
[58] Field of Search .................. 92/103 M, 104; 251/61.1, 331, 335.2, 264, 273, 274

[56] References Cited

U.S. PATENT DOCUMENTS

| | | | |
|---|---|---|---|
| 1,410,205 | 3/1922 | Madigan | 251/331 |
| 1,771,410 | 7/1930 | Landis | 251/331 |
| 1,804,721 | 5/1931 | Valmore | 251/335.2 |
| 3,154,286 | 10/1964 | McFarland, Jr. | 251/331 |
| 3,874,636 | 4/1975 | Bake et al. | 251/335.2 |
| 4,044,998 | 8/1977 | Giese | 251/331 |
| 4,199,850 | 4/1980 | Velan | 251/335.2 |
| 4,220,836 | 9/1980 | Hersey | 92/103 M |
| 4,671,490 | 6/1987 | Kolenc et al. | 251/335.2 |
| 4,768,382 | 9/1988 | Varrese | 92/103 M |
| 4,828,219 | 5/1989 | Ohmi et al. | 251/331 |
| 4,867,201 | 9/1989 | Carten | 251/331 |
| 4,928,919 | 5/1990 | Daicho et al. | 251/335.2 |

FOREIGN PATENT DOCUMENTS 0015576 1/1989 Japan .................. 251/331
0026073 1/1989 Japan .................. 251/331

Primary Examiner—George L. Walton
Attorney, Agent, or Firm—Eric P. Schellin

[57] ABSTRACT

A metal diaphragm valve includes a valve casing and an inverted bowl-shaped metal diaphragm made of an elastic material and having a downwardly projecting collar disk made integral with the metal diaphragm in its center. The metal diaphragm defines within the valve casing a valve chamber into which one end of each of a pair of inlet and outlet passages open, with their opposite end being connected to an external pipe system for cleaning fluid. The vertical movement of a valve stem supported in the valve casing causes the metal diaphragm to move into contact with or away from an annular valve seat that is formed above the valve chamber. When the valve stem is forced down, the metal diaphragm is bent downward against its elasticity to bring its collar disk into close contact with the valve seat, closing the valve chamber. When the valve stem is uplifted, the metal diaphragm restores back to its original position, with the collar disk moved away from the valve seat, opening the valve chamber. Because of this design, there will be no waving of the diaphragm when pressed against the valve seat. Also, the valve seat has a hardened top surface where it is contacted with the collar disk, less scratching would occur due to impacts when the collar disk is bumped against the valve seat in its closing action, minimizing the generation of metal particles.

2 Claims, 2 Drawing Sheets

METAL DIAPHRAGM VALVE

BACKGROUND OF THE INVENTION

1) Field of the Invention

This invention relates to metal diaphragm valves, and, more particularly, so-called "metal-metal touch diaphragm valves", a type adapted for use in pipe arrangements through which ultra-clean fluids flow.

2) Description of the Prior Art

With the increasing micronization of circuit patterns in integrated circuit (IC) and large-scale integrated (LSI) chips in line with growing demand for their higher integration, increasing importance has been attached to the necessity of lessening, in manufacturing stages, as fine foreign matter present in cleaning fluid used to rinse semiconductor chips as possible. Such foreign matter is generally fine metal particles that are generated inside the valves in cleaning fluid pipe systems as a result of valve components sliding or colliding with each other. In order to minimize defects in the manufacturing of semiconductor chips, ultra-clean fluids with a purity level of around 1 ppb currently begin coming into universal use. In addition, there has been increasing demand on the use of such improved valves in pipe arrangements through which rinsing fluid are flowed, that can generate less foreign matters. To this aim, the valves should meet various requirements.

First, the valves must be of construction such as to minimize generation of metal particles. Secondly, the valves should withstand corrosion because corroded surfaces easily crumble letting rust go into the fluid. Furthermore, when the pipe arrangement has to change fluids, it is very essential to not allow any drop of the replaced fluid to remain in the piping before filling with a replacing fluid. There have been made attempts to satisfy the above-mentioned requirements.

One such a proposal was the use of a diaphragm valve. A typical diaphragm valve comprises a valve chamber containing a valve seat and a valve disk and a sheet made of plastics which serves to isolate the chamber from the outside.

However, conventional diaphragm valves have been found to pose problems. The plastic materials used in valve sheets tend to absorb some of the impurities contained in the cleaning fluids in their porous surface. A plastic sheet loaded with foreign matter would tend to another performance problem. In addition, such material does normally not has sufficient resistance against high temperatures and corrosion so that long operation can result in leakage and the generation of fine particles within the valve itself.

To solve the above difficulties, further improvements have been proposed. For example, U.S. Pat. No. 4,828,219 disclosed a metal diaphragm valve.

A metal diaphragm valve includes a metal diaphragm by which the interior of the valve casing is divided to define a valve chamber. Inlet and outlet holes are opened into the valve chamber. The valve chamber contains a valve seat that is situated between the inlet and outlet holes. A valve disk rests on the valve seat and is formed integrally with the diaphragm. A drive unit is mounted outside the valve chamber to drive the valve disk, thereby opening or closing the valve.

It has been discovered, however, that even the improvement is not without some problems. The metal diaphragms used in those metal diaphragm valves are simply shaped like flat disks. There is a major reason for the use of disk-shaped diaphragms; A thin metal diaphragm tends to produce irregular deformation, known as "waving", in its valve seat when it is about to come to full close. For a metal diaphragm valve to give the better performance, the metal diaphragm has to be shaped saucer like, with a deep concave in the center. The sufficiently deep concavity in a metal diaphragm would permit wide space between the valve seat and valve disk, which is situated below the diaphragm, enough to insure proper flow coefficient, Cv value. In other words, a flat disk-shaped diaphragm, while having to suffer much less from the impact of flapping than its saucer-like counterpart, have performance problems, even compared with other types of valve of the same dimension.

Moreover, the valve disk, which is located in the backside of a diaphragm and which is brought into contact with the valve seat at the time of valve closure, needs thorough polishing in that the surface is opposite the valve seat in order to remove the even finest scratchings, so that closure does not permit internal leakage. However, such perfect polishing finish does not only take a long time, but also involve very cumbersome labor. Also, because of the sheet flatness of the diaphragm surface, it is very difficult, if not impossible, to completely smooth out all the scratchings and scars from the disk's contacted face with the valve seat, enough to prevent possible leakage through the disk and seat.

Additionally, in operation, the valve stem is required to weigh on the diaphragm in such a manner to apply uniform pressure over the top surface of the valve seat, with the lower end surface of the stem held perfectly parallelly contacted with the valve seat, to insure leak-proof closure. To this aim, it has to be designed so that the relation of the valve stem and the bonnet with the valve guide should be precise enough to allow the valve stem, in its descent onto the diaphragm, follow a path precisely perpendicular to the plane of the diaphragm.

Conventional metal diaphragm valves are not widely acceptable as they can easily allow the internal generation of fine metal particles and other impurities as a result of their structural failure to achieve perfect leak-proof closure, as stated above.

The present invention, therefore, has been proposed to eliminate the drawback of difficulties with devices in the prior art.

SUMMARY OF THE INVENTION

Accordingly, a primary object of the present invention is to provide a metal diaphragm valve which is suitably adapted for the flow control of ultra-clean fluids and has improved operational reliability and leak-proof properties, such that no impurities can be generated therein, and replaced fluids can be expurgated therefrom with ease.

A metal diaphragm valve according to the present invention comprises a casing which includes a casing chamber defined therein, an inlet hole, and an outlet hole, one end of each of the holes opening into the casing chamber, and the other end opening to the outside of the casing. A substantially circular metal diaphragm is arranged in the casing to define, in a fluid-tight manner, a valve chamber below the diaphragm. The valve chamber is connected in fluid-flow relation with both the inlet and outlet holes. Inside the valve chamber is mounted an annular valve seat between the inlet and outlet holes.

The circular diaphragm is formed with a downwardly projecting collar disk in the center, along a diameter largely following the annular valve seat below when the diaphragm comes down to close the valve. The valve seat has a flat hardened top to insure fluid-tight closure with the collar disk of the diaphragm.

DETAILED DESCRIPTION OF PREFERRED EMBODIMENTS

The present invention will be described in full detail in conjunction with the accompanying drawings.

Figure 1:
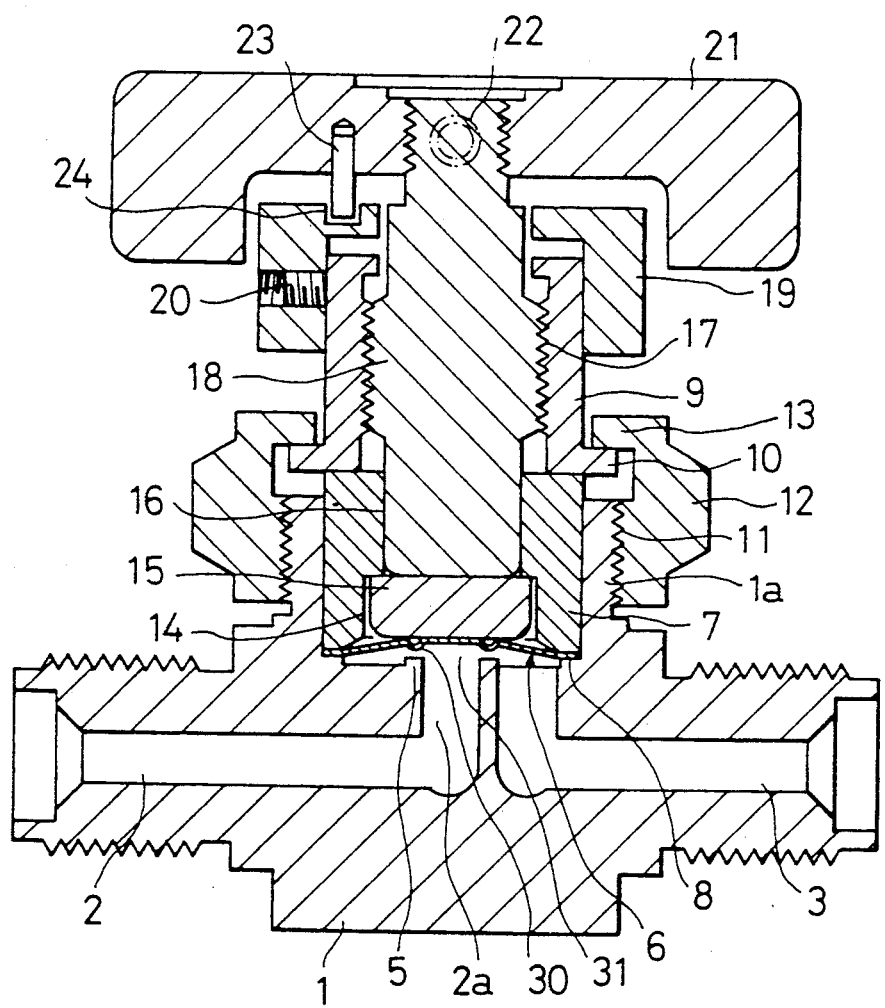
FIG. 1 is a cross-sectional view of a diaphragm valve of the so-called metal-metal touch type according to a preferred embodiment of the present invention.

Referring first to FIG. 1, the metal diaphragm valve built in accordance with a preferred embodiment comprises a valve casing 1 of an inverted T configuration, which may be made of Japanese Industrial Standard SUS 316L stainless steel, an inlet passage 2 formed on one side of the casing 1 and an outlet passage 3 on the other side. At one end of each of the holes 2 and 3, the valve is connected to a piping system, not shown, through which ultra-clean fluid is passed.

The inlet passage 2 has a vertically extending, largely cylindrical discharge part 2a at which the passage opens into the interior of the valve casing 1 at its center. An annular valve seat 5 is formed at an upper end of the discharge part 2a, and is formed to have a flat top surface.

A circular diaphragm 6 made of a thin metal material with sufficient elasticity is mounted within the valve casing 1. The material for the diaphragm 6 may preferably be of a high-tension steel or nickel alloy. Also, the diaphragm 6 carries in the center a downwardly projecting collar disk 30 made integrally with the diaphragm. Also, the metal diaphragm defines below it a valve chamber 31 through which fluid-flow communication is established between the inlet passage 2 and the outlet passage 3 to permit the flow of ultra-clean fluid.

The valve casing 1 includes a vertical cylindrical sleeve portion 1a. The internal diameter of the sleeve portion 1a is the substantially same as the diameter of the diaphragm 6. Also, the diaphragm 6 is clamped along its periphery between a ledge 8 and a retainer 7, both provided in the inside walls of the sleeve portion 1a.

The valve casing 1 includes a cylindrical bonnet 9 having at a lower end thereof a flange 10. The bonnet 9 is vertically movably disposed through an internal thread 17 that is engaged with an external thread 17 formed in the circumference of a valve stem 18. The retainer 7 may preferably be vertically movably disposed to move relative to the bonnet 9 increase or decrease pressure on the diaphragm 6, thereby adjusting its clamp against the ledge 8. A nut 12 carries at an upper end thereof a rim 13, and has an internally threaded portion for gear engagement with an externally threaded portion 11 formed in the outer wall of the vertical sleeve 1a. The nut 12 has its rim 13 to extend over the flange 10 of the bonnet 9. In the above arrangement, turning the nut 12 in one direction causes the vertically movable flange 10 to shift downward, thereby pushing down the retainer 7 against the diaphragm 6.

The valve stem 18 has its lower end brought in contact with a stem piece 15 that is fitted in a central hole axially defined in the retainer 7. The stem piece 15 may preferably be made of a light synthetic resin, preferably teflon. A bonnet cover 19 is provided in the valve casing 1 to fix the bonnet 18 in position by means of a screw 20 inserted into a hole in the side wall of the bonnet 9.

A handle 21 is mounted on top of the valve stem 18, and rotatably disposed to turn in either direction. A pin 22 is provided to insert through a hole formed in the handle 21 and into an aligned hole in the valve stem 18, such as to secure the handle to the valve stem. In this way, the rotation of the handle 21 causes the valve stem 18 to turn in the same direction. A second pin 23 is planted in the underside of the handle 21 from which the pin extends downward into a groove 24 formed in the top surface of the bonnet cover 19. The groove 24 is provided to limit the range of movement of the pin 22 thereby limiting the rotation of the handle 21 within a predetermined angle.

With the above arrangement, when the handle 21 is turned in one direction, the valve stem 18 is caused to rotate in the direction that drives the bonnet 9 downward. As a result, the stem piece 15 is pushed downward to press the metal diaphragm 6 toward the valve seat 5. When the handle 21 is further rotated in the same direction, the bonnet 9 comes down farther to press the diaphragm against its elastic action downward until the collar disk 30 is brought into contact with the valve seat 5. As a result, the valve is fully closed.

Figure 2:
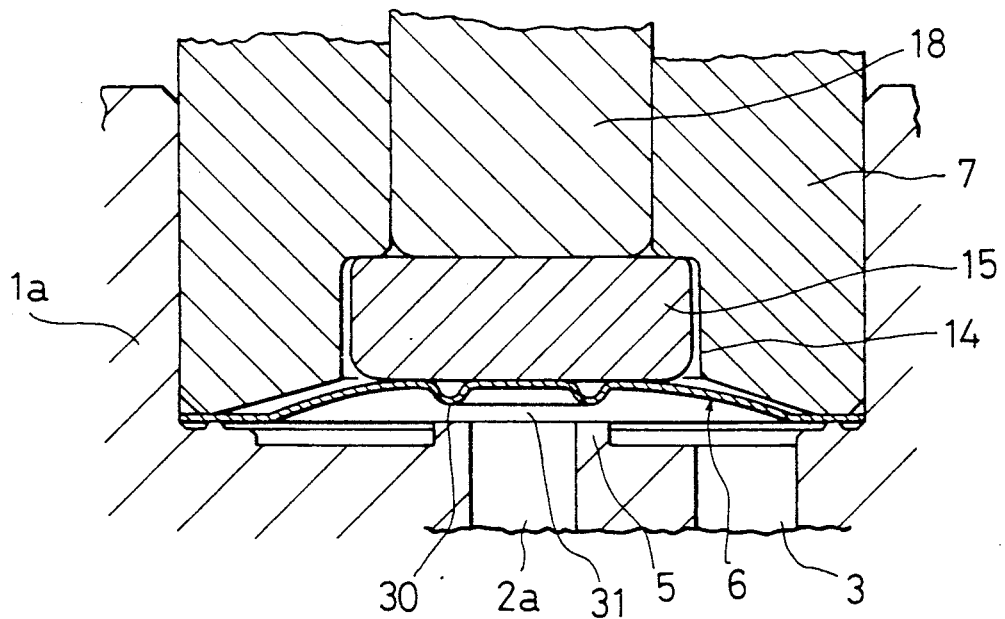
FIG. 2 is an enlarged cross-sectional view of the core portion of the metal diaphragm valve of FIG. 1 in its open position.
Figure 3:
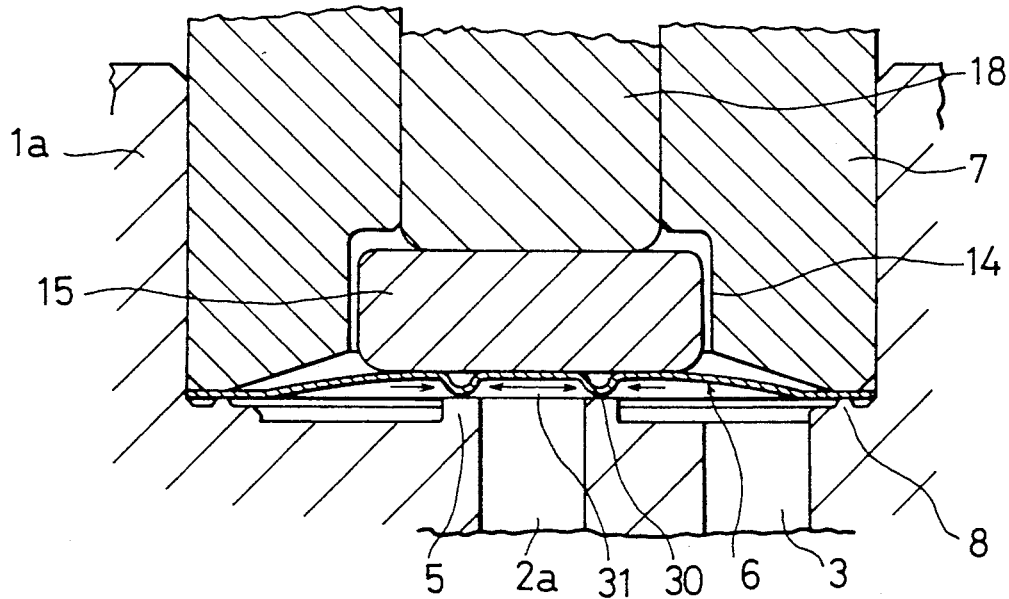
FIG. 3 is a cross-sectional view of the core portion of the metal diaphragm valve of FIG. 1 in its closed position.

Referring to FIGS. 2 and 3, which are more detailed views of the core portion of the metal diaphragm valve of FIG. 1, the metal diaphragm 6 is shown with its downwardly projecting collar disk 30 that is made integral with the diaphragm along a diameter around its center. Below the metal diaphragm 6 is located the annular valve seat 5 having its top made flat to insure fluid-tight contact with the collar disk when the diaphragm is lowered. The top flat surface of the valve seat 5 has to be polished to perfect smoothness free from even the finest scratching through sophisticated finishing methods, such as burnishing with a compression roller.

In a metal diaphragm valve constructed in accordance to the present invention, when the metal diaphragm 6 is caused to elastically bend downward onto the valve seat 5, as illustrated in FIG. 3, the collar disk 30 can rest on the annular flat top of the valve seat in fluid tight state, without causing waving, as in conventional valves, thereby blocking the fluid through the valve chamber 31. Because of the increased design freedom to achieve heightened closure between the top flat of the valve seat 5 and the collar disk 30 of the diaphragm 6, it is possible to have a wider space between the diaphragm and the valve seat the possible with conventional valves. This can enable designers to obtain a greater stroke and larger Cv value of metal diaphragm 6.

When, in the closed position, the elastic metal diaphragm 6 is bent down under the downward pressure of the stem piece 15, the diaphragm develops tension radially in its surface, as indicated by arrows in FIG. 3. This tension is used to cause the diaphragm 6 to restore back to its original shape, when the stem piece 15 is allowed to lift up off from the diaphragm to the wide-open position.

When the handle 21 is turned in the direction to open the valve, the stem 18 is rotated to drive the stem 18 to move up in the thread 17 of the bonnet 9, releasing the diaphragm 6 of the pressure exerted to weigh it down against the valve seat 5. As a result, the diaphragm begins to move upward by its own elasticity. With the further rotation of the handle 21, the retainer 7 is caused to move up from the diaphragm 6 until the diaphragm is restored back to its original saucer-like shape, against the weight of the stem piece 15, which may be made of a light synthetic resin material such as teflon. The diaphragm 6 is now fully clear off from the valve stem 5, opening the valve chamber 31 to allow the passage of ultra-clean fluid from the inlet passage 2 into the outlet passage 3.

When the valve is closed, the hard metal diaphragm 6 is caused to come down to bump its collar disk 30 against the less hard valve seat 5, which may be made of Japanese Industrial Standard SUS316 L steel, the flat top of the semi-torroidal configured collar disk may easily incur dents or scratching due to impacts. The hardening of the flat top of the valve seat 5 as by burnishing finish would greatly minimize this problem. The hardened valve seat 5 would become less likely to generate metal particles as a result of impact-induced dents or scratching.

In addition, with a metal diaphragm valve according to the present invention, careful polishing operation can mostly be limited to the valve seat 5 to remove all possible scratching in its flat top. By contrast, with conventional metal diaphragm valves, polishing should be applied to various parts within the valve casing, demanding lots of labor and time.

Furthermore, because of the heightened tension of the collar disk 30, no greater demand both on the uniform thickness of the stem piece 15 and the angular position of the retainer 7 and the stem piece 15 relative to the guide surface as required by conventional metal diaphragm valves to allow the valve stem to follow a path perpendicular with the plane of the diaphragm. Should the pressure exerted by the retainer 7 on the metal diaphragm 6 in its closed position be not uniformly distributed over the entire surface of the diaphragm, the high-tension collar disk 30 would be held uniformly against the flat top of the valve seat 5 into complete fluid-tightness.

Also, the narrow flat top of the valve seat 5 minimizes the area that requires polishing to remove possible surfacial scratching, cutting back labor in the manufacturing of valves.

Thus, as stated above, with the diaphragm valve built according to the present invention, it is possible to maintain an ultra-clean fluid free from impurities for a very long period. The absence of sliding parts in the valve chamber also contributes to this advantage because there will be no creation of metal particles as a result of sliding between metallic surfaces.

What is claimed is:

1. A metal diaphragm valve for use in piping systems for ultra-clean fluids, comprising:
   a valve casing including therein an inlet passage and an outlet passage,
   a valve chamber into which one end of each of the inlet and outlet passage open,
   the valve chamber being defined by an inverted bowl-shaped metal diaphragm that is disposed within the valve chamber above the inlet and outlet passages, with the opposite end being connected with an external piping system,
   the metal diaphragm having a center and being held clamped along a periphery thereof between a ledge formed within the valve caging and a retainer located above the ledge,
   a semi-toroidal collar disk having a downward projection of an annular cross-section integral with the metal diaphragm and of substantially similar thickness as the metal diaphragm,
   an annular valve seat disposed below the collar disk and having a central bore that opens into the valve chamber,
   the valve seat being formed with a flat burnished top for providing sealing contact with the collar disk,
   a vertically disposed valve stem reciprocably disposed in an axial bore formed in the retainer, and
   a stem piece mounted on top of the metal diaphragm,
   whereby said burnished flat top and said collar disk operatively cooperate to effect a sealing contact when the valve stem causes the stem piece to move against the metal diaphragm thereby forcing the metal diaphragm against the burnished flat top of the valve seat, said sealing being accomplished without appreciable deformation of the collar disk due to the said configuration thereof and without appreciable formation of metal particles from multiple use of the valve.

2. A metal diaphragm valve as set forth in claim 1, wherein a handle is mounted on top of the valve stem.

* * * * *